United States Patent
Wu et al.

(10) Patent No.: US 7,340,454 B2
(45) Date of Patent: *Mar. 4, 2008

(54) PROCESSING INDEX ACTION REQUESTS FOR SEARCH ENGINES

(75) Inventors: Yuh-Cherng Wu, San Jose, CA (US); Huiling Gong, Sunnyvale, CA (US)

(73) Assignee: Sap AG, Walldorf (DE)

( * ) Notice: Subject to any disclaimer, the term of this patent is extended or adjusted under 35 U.S.C. 154(b) by 260 days.

This patent is subject to a terminal disclaimer.

(21) Appl. No.: 10/920,046

(22) Filed: Aug. 17, 2004

(65) Prior Publication Data

US 2005/0076022 A1    Apr. 7, 2005

Related U.S. Application Data

(60) Provisional application No. 60/496,166, filed on Aug. 18, 2003.

(51) Int. Cl.
*G06F 17/30* (2006.01)

(52) U.S. Cl. ................ 707/3; 707/4; 707/10

(58) Field of Classification Search ............ 707/3, 707/10

See application file for complete search history.

(56) References Cited

U.S. PATENT DOCUMENTS

| | | | |
|---|---|---|---|
| 5,765,033 | A | 6/1998 | Miloslavsky |
| 5,924,090 | A | 7/1999 | Krellenstein |
| 6,269,361 | B1 | 7/2001 | Davis et al. |
| 6,269,364 | B1* | 7/2001 | Kennedy et al. ............ 707/5 |
| 6,490,577 | B1 | 12/2002 | Anwar |
| 6,980,999 | B1* | 12/2005 | Grana ............... 707/104.1 |
| 7,076,484 | B2* | 7/2006 | Dworkis et al. ............ 707/5 |
| 7,133,863 | B2 | 11/2006 | Teng et al. |
| 2002/0107842 | A1 | 8/2002 | Biebesheimer et al. |
| 2002/0143744 | A1 | 10/2002 | Teng et al. |
| 2003/0018468 | A1 | 1/2003 | Johnson et al. |
| 2004/0015490 | A1 | 1/2004 | Snyder et al. |
| 2004/0230564 | A1* | 11/2004 | Simon et al. ............ 707/2 |
| 2006/0053184 | A1* | 3/2006 | Grana ............... 707/204 |

FOREIGN PATENT DOCUMENTS

EP         1072984         1/2001

(Continued)

OTHER PUBLICATIONS

Meng et al. Building efficient and effective metasearch engines, ACM Computing Surveys, vol. 34, Issue. 1, pp. 48-89, Mar. 2002.*

(Continued)

*Primary Examiner*—John Breene
*Assistant Examiner*—Baoquoc N. To
(74) *Attorney, Agent, or Firm*—Fish & Richardson P.C.

(57) ABSTRACT

One implementation provides a method included in performing an action on a searchable index of content that is electronically stored in a knowledge base. The method includes receiving an input indicating a request that a computer-implemented process be performed that acts upon a specified index of content that is searchable using a predefined one of multiple search engines, wherein the content resides within a specified one of multiple electronic knowledge bases. The method further includes performing a computer-implemented process that composes, using the received request, a request to perform the computer-implemented process, wherein the request has a format that is compatible with the predefined one search engine. The composed request is submitted to the predefined one search engine for execution.

31 Claims, 10 Drawing Sheets

FOREIGN PATENT DOCUMENTS

| JP | 2000/231520 | 8/2000 |
|---|---|---|
| JP | 2001/297261 | 10/2001 |
| WO | 00/062264 | 10/2000 |
| WO | 01/42880 A2 | 6/2001 |
| WO | 01/67225 A2 | 9/2001 |
| WO | 03/005340 | 1/2003 |

OTHER PUBLICATIONS

Armstrong et al "The Java Web Services Tutorial" Feb. 20, 2003, [Retrieved from the Internet on Nov. 11, 2004 at http://web.archive.org/web/20030701055300/http://java.sun.com/webservices/docs/1.1/tutorial/doc/JavaWSTutorial.pdf>].

Dreilinger, "Experiences with Selecting Search Engines Using Metasearch" *ACM Transactions on Information Systems*, Jul. 1997, vol. 15, No. 3, pp. 195-222.

Gauch, et al. "Information Fusion with ProFusion" *WebNet—World Conference of the Web Society*, Oct. 15-19, 1996, pp. 174-179.

Meng "Building Efficient and Effective Metasearch Engines" *ACM Computing Surveys*, Mar. 2002, vol. 34, No. 1, pp. 48-89.

U.S. Appl. No. 10/439,832, filed May 16, 2003, Simon et al.

Bartlett et al. "Learning Changing Concepts By Exploiting The Structure of Change," *Machine Learning*, 41 (2000) 153-174.

T. Bui et al. "An Agent-Based Framework For Building Decision Support Systems," *Decision Support Systems*, 25 (1999) 225-237.

Ferber, "Multi-Agent Systems: An Introduction to Distributed Artificial Intelligence," *Addison-Wesley*, 1999, pp. 87-142.

Ferber, "Multi-Agent Systems: An Introduction to Distributed Artificial Intelligence," *Addison-Wesley*, 1999, pp. 341-398.

R. Sikora et al. "A Multi-Agent Framework For The Coordination And Integration Of Information Systems," *Management Science*, 44 (1998) S65-S78.

SAP Labs, Inc., "Specification Distributed Intelligent Agent, Version 1.2," Sep. 14, 1999, ps. 11-15, 18-19, 25-31, 41-42, 47-50, 52-62.

SAP CRM 2.0C IIA Search Document, Jan. 2001, 1 pg.

Weiss, "Multi-Agent Systems: A Modern Approach To Distributed Artificial Intelligence," *The MIT Press*, 2000, pp. 121-164.

Weiss, "Multi-Agent Systems: A Modern Approach To Distributed Artificial Intelligence," *The MIT Press*, 2000, pp. 259-298.

\* cited by examiner

PROCESSING INDEX ACTION REQUESTS FOR SEARCH ENGINES

RELATED APPLICATIONS

This application claims the benefit of U.S. Provisional Patent Application Ser. No. 60/496,166, which was filed on Aug. 18, 2003.

TECHNICAL FIELD

This document describes a system that provides, within an enterprise computing system, the ability to use an existing or third-party search engine software application with a new software application being implemented.

BACKGROUND

In today's ever more complex enterprise computing systems, it is often desirable, and even necessary in many cases, to have within a single enterprise computing system various different software applications from different software vendors. In such a case, the enterprise computing system is referred to as having a heterogeneous system landscape. Integrating various software applications from different vendors, and sometimes applications from the same vendor, is a challenging and often costly task.

There are many software applications where it is helpful for a user, when using the software application, to perform a search for content electronically stored in a knowledge base. One example of such a software application is a customer interaction center software application. A customer interaction center application is a software application that is used in a customer interaction center, for example, a call center. A customer interaction center software application assists a human being agent (that is, a user) in interacting with a customer. During the course of a customer interaction, it may be helpful for the interaction center agent to search for information that is stored in a knowledge base, for example, to find a solution to a customer's problem.

It is possible that search engine functionality may be built in, or pre-configured, to operate with a particular software application. Such may be the case, for example, when both the software application and the search engine functionality are provided by the same software vendor. Even where a software application and a search engine application are not designed to work with one another, because for example the two are provided by different software vendors, it may be possible to integrate the search engine application with the software application so that functionality from both software applications may be executed as an integrated software solution where, from the user's perspective, it appears that a single software application is being executed. Although such integration may be possible, it typically has required a costly and time-consuming software integration effort.

As a result, in many cases where there is implemented, in a single computing environment, both a software application and a search engine application that may be needed in combination with the software application, the two applications operate entirely separately. As such, a user will need to switch between the two applications, for example, by switching between different windows. Particularly in a customer interaction center application, where timeliness is typically essential, this switching between the interaction center application and the search engine application may take too much time, and as such may be unacceptable from a customer care perspective. In addition, where the two functions are not integrated, various functions that may be possible with an integrated solution may not be possible.

SUMMARY

One implementation provides a framework that allows a software application to be easily integrated with a search engine application. In addition, one implementation provides a recording function that is made possible by the software application and the search engine application being integrated.

One implementation provides a method included in performing an action on a searchable index of content that is electronically stored in a knowledge base. The method includes receiving an input indicating a request that a computer-implemented process be performed that acts upon a specified index of content that is searchable using a predefined one of multiple search engines, wherein the content resides within a specified one of multiple electronic knowledge bases. The method further includes performing a computer-implemented process that composes, using the received request, a request to perform the computer-implemented process, wherein the request has a format that is compatible with the predefined one search engine. The composed request is submitted to the predefined one search engine for execution.

The details of one or more implementations are set forth in the accompanying drawings and the description below. Other features, objects, and advantages will be apparent from the description and drawings, and from the claims.

DETAILED DESCRIPTION

Figure 1:
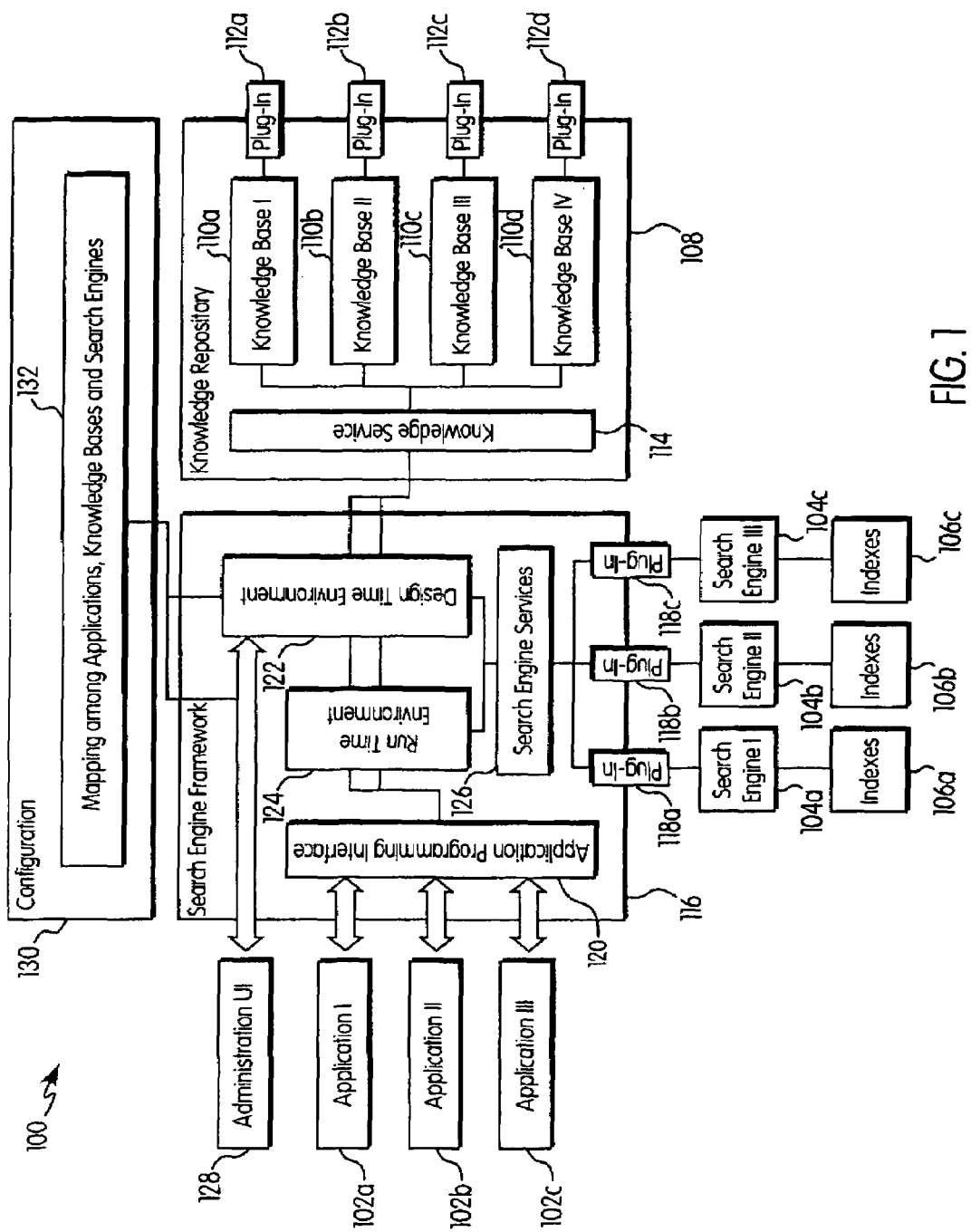
FIG. 1 is a functional block diagram of an enterprise computing system including a search engine framework that integrates multiple different search engines into the system.

An enterprise computing system 100, shown in FIG. 1, includes several software applications, there being three such applications 102a, 102b and 102c in this example. Each software application 102a-102c makes use of services that enable users to search for electronically stored knowledge base information. Several search engines—in this example, three such engines 104a, 104b, 104c—are included, and may be search engines of different types and, for example, offered by different software vendors. Searchable indexes 106a, 106b and 106c are each associated with one of the search engines 104a-104c, and each may include more than one index. A knowledge base index being associated with a particular one of the search engines 104a-104c means that the index is created and maintained in a format that enables it to be searched using the particular search engine with which the index is associated. When a user wishes to search for content stored in a particular knowledge base, it is an index of that knowledge base content that is searched by the applicable search engine, and in response, a "hit list" of content may be provided that meets certain user-specified search criteria. Thereafter, a user may initiate the retrieval of content identified in the "hit list" directly from a knowledge base or other data source. In one implementation, the "hit list" of content includes content that is directly provided by the knowledge base or data source. In this implementation, the run-time environment 124 collects information provided by the search engine services 126 to determine which content is to be retrieved from the knowledge repository 108 and included within the "hit list". The run-time environment 124 sends a request to the knowledge service 114 and receives, in return, information that is contained within one of the knowledge bases 110*a-d* or contained within an external data source.

By way of example, the software applications 102*a*-102*c* may be 1) a customer call center application, 2) an internet-accessible self-service customer interaction center application, and 3) a field-service technician application. In a call center application, a call center agent may search for a solution to a customer problem with a purchased product in a solution database (that is, in a knowledge base of product problem solutions). In such an example, the call center agent may be on the telephone with the customer, and may access the solution and describe it to the customer over the telephone. The call center agent may also, for example, retrieve a solution and electronically transmit a document containing the solution to the customer, for example, via electronic mail. The call center software application may also record solutions being retrieved and sent to a customer, as a record of interactions with the customer for future reference if necessary. A self-service customer interaction center may enable a customer to enter information about a problem, initiate a search for a solution, and retrieve information explaining the solution for the customer. As with the call center application, a record may be made of the customer interaction and the solution material that was identified and retrieved by the customer. A field service software application may enable a field technician that makes on-site calls to retrieve solutions to problems encountered when making a field repair. Again, such an application may include recording functionality to record the solutions being retrieved by the technicians, and on behalf of specified customers whose equipment is being repaired. Of course many other software applications make use of knowledge base search functionality, and these examples are to be understood as only a few of the many possibilities.

Search engines are important components for business operations in an enterprise system, such as the system 100, to efficiently locate records or information needed to complete business transactions. For example, in the area of customer service, locating a customer using various search criteria, such as an address, a name, past interaction records, is very helpful in providing quality service. The search engine designed for the enterprise system can quickly locate a specific record from millions of records or documents. Such a search engine can provide powerful search capabilities, such as fuzzy text searches, or traditional database retrievals. With increasing Internet access, more search engines are developed to provide Internet search capabilities.

There are various different reasons why it may be desirable for an enterprise computing system 100 to make use of multiple different search engines. For example, it may be that significant time and expense has already been expended to get a particular search engine application implemented so that it works well with a particular software application and with a particular existing knowledge base. In such an example, it may be desirable to maintain that application as it is while implementing other applications that use other search engines. This may be particularly useful, for example, when two companies with different software solutions and search engines are combined, for example, through a corporate merger. Another example of why it may be desirable for an enterprise computing system 100 to make use of multiple different search engines is that it may be desirable to implement a certain search engine application that may not be standard with a particular software application, for example, to improve the performance of search services.

The enterprise computing system 100 has a knowledge repository 108, which includes a number of separate knowledge bases, there being in this example four such knowledge bases 110*a*-110*d*. Electronically stored in the knowledge bases 110*a*-110*d* is content that a person interacting with software applications 102*a*-102*c* may wish to retrieve. The knowledge bases in an enterprise system, such as the knowledge bases 110*a-d* in the system 100, may include any business information that is needed for business operation. For example, a solution knowledge base may be used to provide solutions or steps to fix a problem for a service company. A product knowledge base may contain product-related specifications and descriptions. A business partner knowledge base may contain customer information that has been collected and processed over time. An interaction record knowledge base may contain interaction history information for a company and its customers. Of course, a knowledge base can have combined data sources (e.g., interaction records with customer information, product information and related documents). In addition, there may be various other types of knowledge bases that may be included within a knowledge repository, such as the repository 108 shown in FIG. 1.

The electronically stored content in the knowledge bases 110*a*-110*d* is indexed in the previously discussed indexes 106*a*-106*c* to enable the previously mentioned index searching. Each knowledge base 110*a*-110*d* has an associated plug-in 112*a*-112*d* to external data sources that provide the data for the knowledge bases 112*a*-112*d*. When information is retrieved from a search index (such as from one of the indexes 106*a-c*), some basic information can be presented in a "hit-list" to a user, but the detailed information may be from the search index or from a data source via the knowledge base plug-ins 112*a-d*. If the display details are from the search index, the speed may be fast, but the information may not be completely up-to-date (depending on when the indexes 106*a-c* were last updated). Thus, in one implementation, details are retrieved from an original data source to obtain the most recent information when such is requested or required, and information directly from the search index can also be used in certain situations when speed of information retrieval is a premium. A rule-based engine contained within the search engine services 126 or the run-time environment 124 may be used, in one implementation, to determine whether to retrieve content information for the "hit-list" from one of the indexes 106*a-c*, directly from an external data source coupled to the knowledge repository 108 via the plug-ins 112*a-d*, or from a combination thereof. The rules used by the rule-based engine may be configured by the design-time environment 122 or by the run-time environment 124 upon receipt of input from the applications 102*a-c*.

As is shown in FIG. 1, the application programming interface 120 may be directly coupled to the knowledge service 114 within the knowledge repository 108. The knowledge service 114 is capable of providing information from the knowledge repository 108 directly to the applications 102a, 102b, or 102c through the application programming interface 120. Thus, in one implementation, the applications 102a, 102b, and/or 102c are capable of directly retrieving information from the knowledge repository 108. The knowledge repository 108 may also be provided with information from one or more external data sources through the plug-ins 112a-d.

The knowledge repository 108 also has a knowledge service component 114, which provides services related to the knowledge bases 110a-110d and provides an interface for access and interaction with the knowledge bases 110a-110d.

A search engine framework 116 is part of the enterprise computing system 100. The search engine framework 116 interfaces with the software applications 102a-102c, the search engines 104a-104c, and the knowledge repository 108. For each of the search engines 104a-104c, the framework 116 includes an associated plug-in 118a, 118b and 118c, which translates search engine functions specified in a common, or generic, format into a format usable by the associated search engine 104a-104c. In one example, XML (the Extensible Markup Language) is used to define a generic interface that can be consistently shared and translated from different search engines. In another example, a programming application interface is used to make sure the different search engines are implemented via the standard interface. As such, the plug-ins 108a-118c enable search engine functions to be performed within the framework 116 in a generic way, while enabling the use of different search engines. This offers the flexibility, for example, to continue the use of search engines that are included in legacy computing solutions, or search engines that may already have be adapted to be used with a particular software solution.

Each of the plug-ins 118a-118c consists of executable software code that integrates the particular search engine with which the plug-in is associated into the enterprise computing system 100. Each plug-in, for example, may include code that, when executed, takes a command (for example, an index search command or an index action command) that is expressed in the generic format of the search engine framework 116, and composes from that generically expressed command a similarly functioning command that is in a format that can be executed by the specific search engine associated with the plug-in. This may be implemented, for example, using object-oriented programming methods, wherein the plug-in functions to instantiate, from a generic command provided by the search engine services component 126, an object for a command that is to be used by the applicable search engine. In addition, for example, each of the plug-ins 118a-118c may include configuration information for the associated search engine and that is needed by the search engine services component 126. Such configuration information may include, for example, an identification of default fields used by the particular search engine in executing an index search request, an identification of information that must be stripped from a command when executing an index search request, etc. Default field values may be provided by a plug-in when a search engine requires a value not provided by the software application. The plug-in may strip away values that are provided by the software application but not required by, or relevant to, the search engine.

The search engine framework 116 also includes an application programming interface 120 for the software applications 102a-102c that enables communication between the applications 102a-102c and the framework 116. The framework 116 also has a design-time environment 122, a run-time environment 124, and a search engine services component 126. The design-time environment 122 is a software environment that, among other functions, provides the ability for an administrator, using an administration user interface (UI) 128, to create a configuration database 130. The configuration database 130 includes electronically stored mappings 132 among the applications 102a-102c, the knowledge bases 110a-110d, and the search engines 104a-104c. For example, the stored mappings 132 specify the particular one of the search engines 104a-104c that is to be used to execute a search request received from a particular one of the applications 102a-102c and that includes a request for an identification of certain content that is stored in a specified one, or more, of the knowledge bases 110a-110d. The design-time environment 122 also provides the ability for an administrator to perform actions related to the indexes 106a-106c, for example, to create an index of content that is stored in a specified one, or more, or the knowledge bases 110a-110d, and to associate that index with one of the search engines 104a-104c. In one implementation, an automated process within the design-time environment 122 or, more generally, within the search engine framework 116, can perform actions related to the indexes 106a-106c without user intervention using various rules and a rule-based engine.

The search engine services component 126 is a software application that includes a common, or generic, version (that is, not necessarily adapted for a particular search engine) of various services related both to the execution of a search request and to the performance of various indexing actions. As such, for example, when the design-time environment 122 receives an input from the administration UI 128 requiring that a certain specified knowledge base index be created and associated with a particular specified one of the search engines 104a-104c, the design-time environment 122 may invoke an index creation service included in the search engine services component 126. The index creation service may, in turn, initiate and control the various actions involved in creating the index. In this example, the actions may include initiating a translation of the index creation request into a format that is usable by a specified one of the search engines 104a-104c, sending the request to the specified search engine to be executed, and controlling communications with the knowledge repository 108. More detail of an example of how an index may be created is provided later.

The run-time environment 124 is a software environment that performs various actions in response to an index search request received from one on the software applications 102a-102c. For example, the run-time environment 124, in response to the receipt of an index search request, may determine, using the configuration database 130, which one of the search engines 104a-104c has been mapped to be used to execute the received index search request. After doing this, the run-time environment 124 may then invoke an appropriate service within the search engine services component 126, which service may initiate and control the various actions involved in executing the index search request. In this example, the actions performed by the service may include initiating a translation of the index search request into a format that is usable by the specified one of the search engines 104a-104c, sending the translated index search request to the specified search engine to be executed, and initiating the return of a "hit list" to the software application 102a-102c from which the index search was received.

More detail of an example of an index search request is executed is provided later.

In one implementation, the search engine framework 116 includes an internal search engine (which is not shown in FIG. 1). In this implementation, the internal search engine is coupled to the search engine services 126. The internal search engine is known to and provided within the framework 116. For example, the internal search engine may be managed or maintained by the same company that manages or maintains the framework 116. No plug-in is required for the search engine services 126 to invoke the internal search engine, because all interface, configuration, data format, etc., relating to the internal search engine is controlled by the search engine services 126. The internal search engine is also coupled to and uses an internal index, which is also contained within the framework 116.

In one implementation, the applications 102a-c may send requests to the framework 116 that cause multiple indexes to be searched. In this implementation, an individual request that is received from one of the applications 102a-c includes information that is used to identify multiple knowledge bases. The request may explicitly identify these knowledge bases, or it may contain information that the framework 116 can use to identify these knowledge bases (such as specific attribute information that is associated with a particular knowledge base). The framework 116 accesses the mapping information 132 to determine which of the search engines 104a-c are to be used for search operations with respect to the identified knowledge bases. The framework 116 is then capable of creating search requests that are sent to the determined search engines 104a-c and providing search results to the one application 102a-c that had sent the original request.

Figure 2:
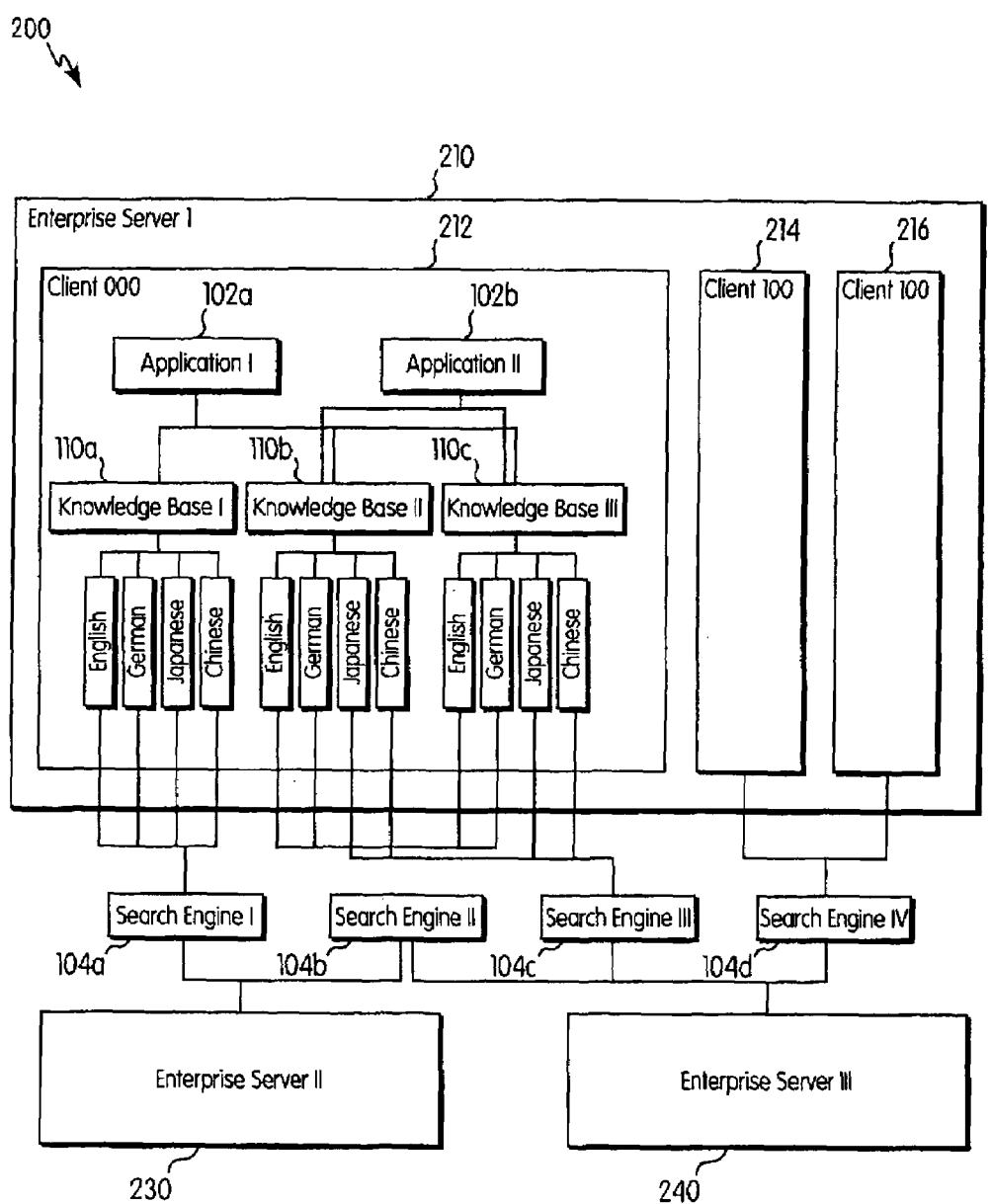
FIG. 2 is a diagram depicting mappings between components of the enterprise computing system and the multiple different search engines.

An example enterprise computing system 200, shown in FIG. 2, illustrates an example of mappings, such as the mappings 132 stored in the configuration database 130 shown in FIG. 1, that may be specified among software applications, knowledge bases, and search engines. In this example, the enterprise computing system 200 has three enterprise servers 210, 230 and 240. In one example, the different enterprise servers may provide different software functions. For example, one enterprise server may contain and execute a customer relationship management (CRM) software solution, another enterprise server may contain and execute a supply chain management (SCM) software application, and another enterprise server may contain and execute an enterprise resource planning (ERP) software application.

In addition, each of the enterprise servers 210, 230 and 240 may be sub-divided into multiple client systems that contain and execute a sub-set of functions provided by the software application provided on the enterprise server. For example, enterprise server 210, in this example, has three client systems 212, 214 and 216. In one example, the different client systems may correspond to different departments of an enterprise, for example, one client system may be provided for a customer service department, another for a marketing department, another for an accounting or financials department, and another for a human resources department. In another example, multiple clients may be used by different companies in a hosting solution where small and medium-scaled companies may pay usage fees to a hosting solution without managing the data. It will be appreciated that enterprise servers 230 and 240 may similarly be sub-divided into multiple client systems, although not shown in FIG. 2.

The client system 212, in this example, has two software applications 102a and 102b, which are the software applications also shown in FIG. 1. As discussed previously, these software applications 102a and 102b each make use of knowledge base search services. In particular, Application I 102a provides the ability to search three knowledge bases 110a, 110b and 110c, whereas Application II 102b provides the ability to search only two of the knowledge bases, namely knowledge bases 110b and 110c.

FIG. 2 depicts mappings that show which one of the search engines 104a-104d are used to execute an index search depending on the software application from which the index search was requested and the specified knowledge base for the index search. In addition, the mapping takes into account the language specified for the search, for example, English, German, Japanese, Chinese, etc., in that different searches may be used for the same software application and knowledge base, but where the specified language differs.

FIG. 2 shows that Application I 102a and Knowledge Base I 110a are mapped to Search Engine I 104a, regardless of the language specified. Knowledge Base II 110b for searches originating from either Application I 102a or Application II 102b is mapped to Search Engine II 104b, where the specified language is English or German, and is mapped to Search Engine III 104c, where the specified language is Japanese or Chinese. FIG. 2 also shows that all software applications included in client systems 214 and 216 are mapped to Search Engine IV 104d, software applications within Enterprise Server II 230 are mapped to either Search Engine I 104a or Search Engine II 104b, and software applications within Enterprise Server III 240 are mapped to either Search Engine II 104b, Search Engine III 104c, or Search Engine IV 104d. In another implementation (not shown in FIG. 2), distinguishing of languages may not be needed for a search engine that can automatically interpret languages and distribute requests and/or information into different indexes. In this implementation, such a search engine contains added functionality and intelligence to analyze textual input and automatically interpret this input using a language-based, content analysis engine.

Figure 3:
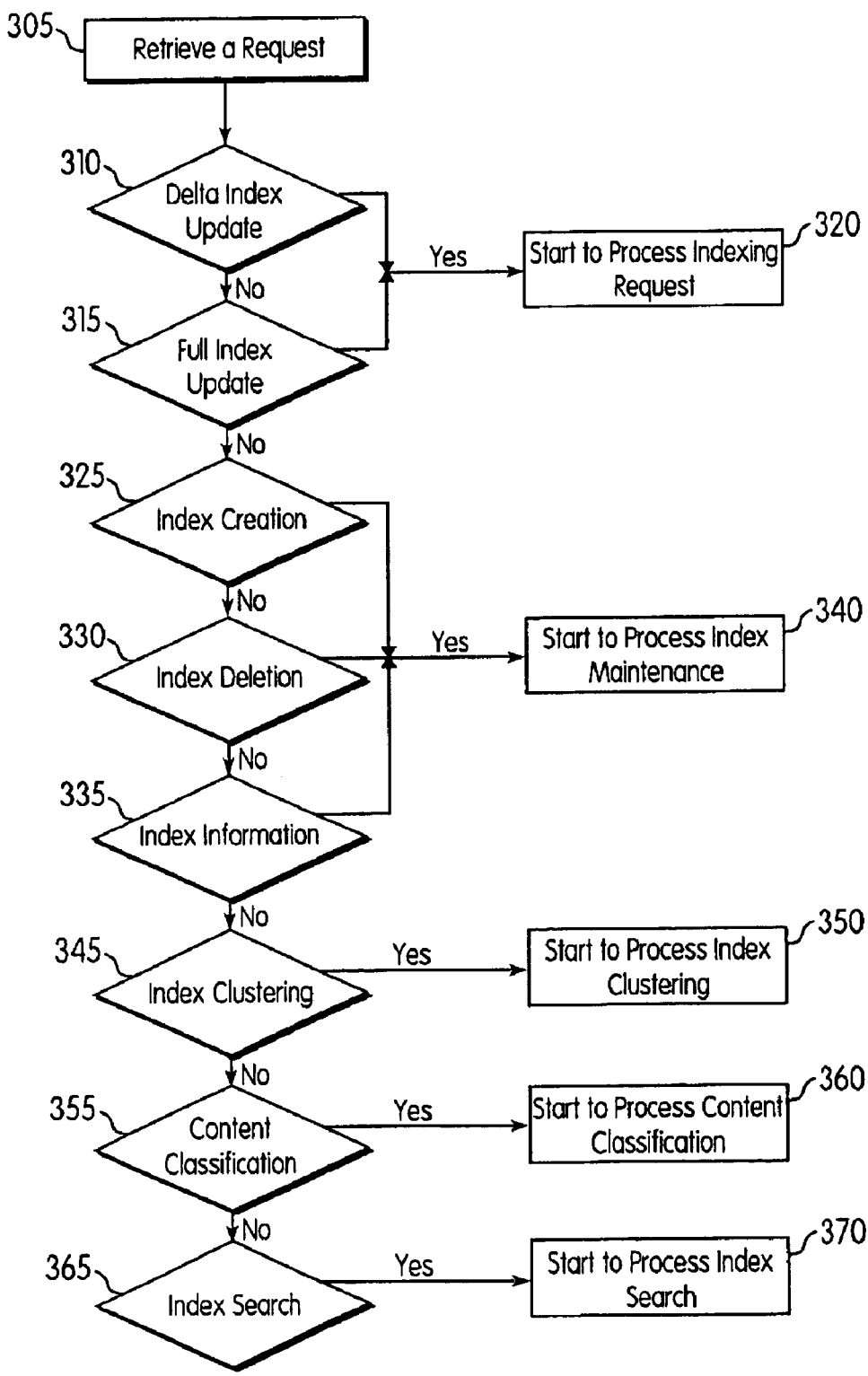
FIGS. 3-8 are flowcharts of example processes that may be executed in response to a search engine framework receiving a request to either perform an index search or to perform one of various different index actions.

FIG. 3 is a flowchart that shows a computer-implemented process 300 that occurs, within the search engine framework 116 shown in FIG. 1 for example, when a request is initially received, which begins at block 305. The request may be either a request that an indexing action be performed, received for example from either the administration UI 128 or one of the applications 102a-102c, or a request that an index search be performed, received for example from one of the applications 102a-102c. In the FIG. 1 example, the initial processing depicted in FIG. 3 may be carried out, for example, by the design-time environment component 122 and the run-time environment component 124.

Figure 5:
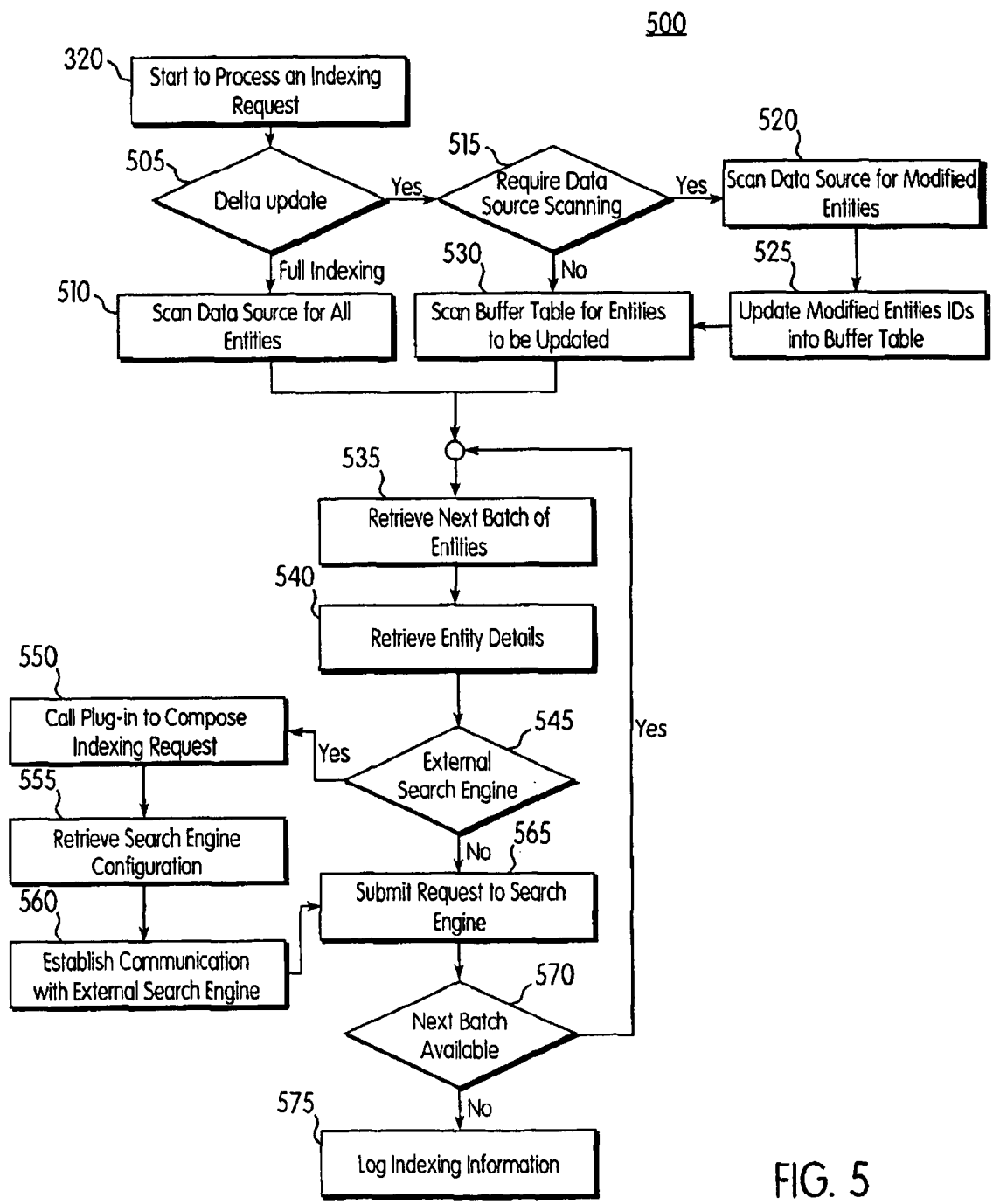
Figure 8:
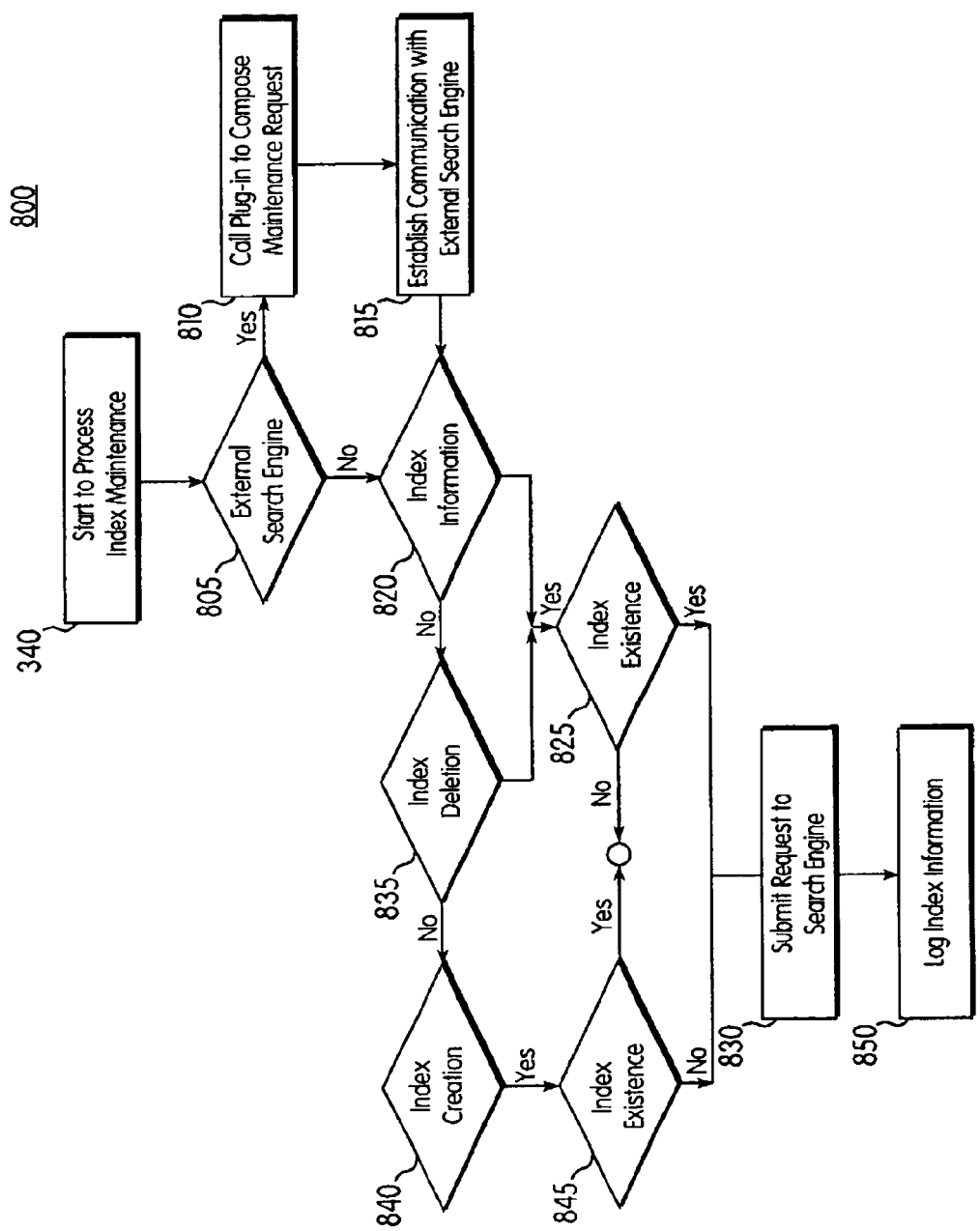

As shown in FIG. 3, the initial action that is taken in response to the receipt of a request depends on the type of request that is received. For example, if it is determined at blocks 310 and 315 that the request is one for either a delta index update or a full index update, then the processing proceeds to block 320 where the processing of the indexing request is started (an example of which is shown in FIG. 5). Generally, a delta index update is one where the update only takes into account modifications to the knowledge base that have occurred after the most recent update or creation of the index, whereas a full index update is one that in essence compiles data into an existing index or a new index every time an update is performed. If it is determined at blocks 325, 330 or 335 that the request is one either to create an index, delete and index, or retrieve information about an index, then the processing proceeds to block 340 where an index maintenance process is started (an example of which is shown in FIG. 8).

Figure 6:
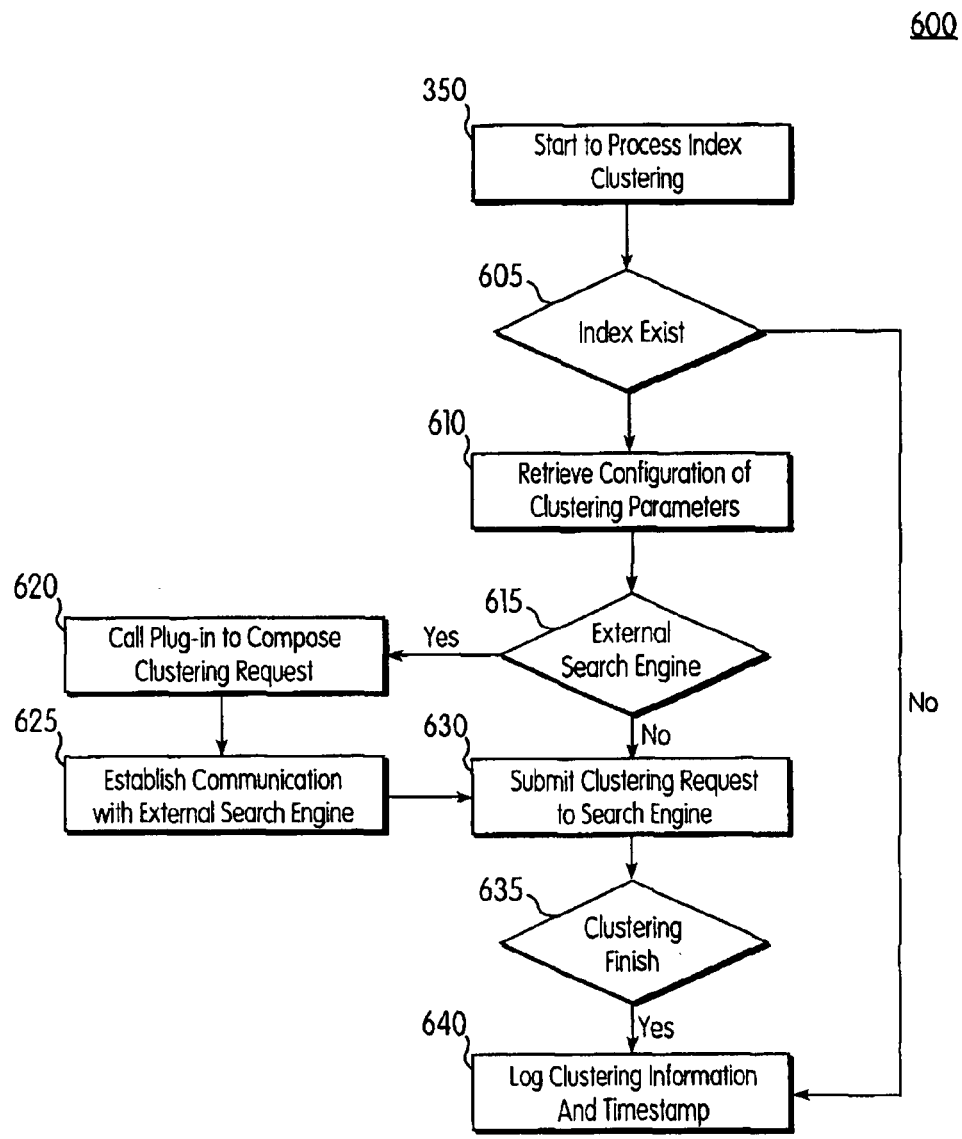

Next, if it is determined at block 345 that the request is one for index clustering, then the processing proceeds to block 350 where a content clustering process is started (an example of which is shown in FIG. 6). Generally, clustering involves the grouping of indexed content into groups, or clusters, retrieving characteristic features from each cluster, and storing the characteristic cluster features, for example in a file or a database table. A feature-cluster table may then be used to filter out non-essential features and to compare the differences between old relevant cluster feature sets and new relevant cluster feature sets. Clustering processes may further involve more advanced clustering, such as hierarchical clustering or other structures with sub-structures.

Figure 7:
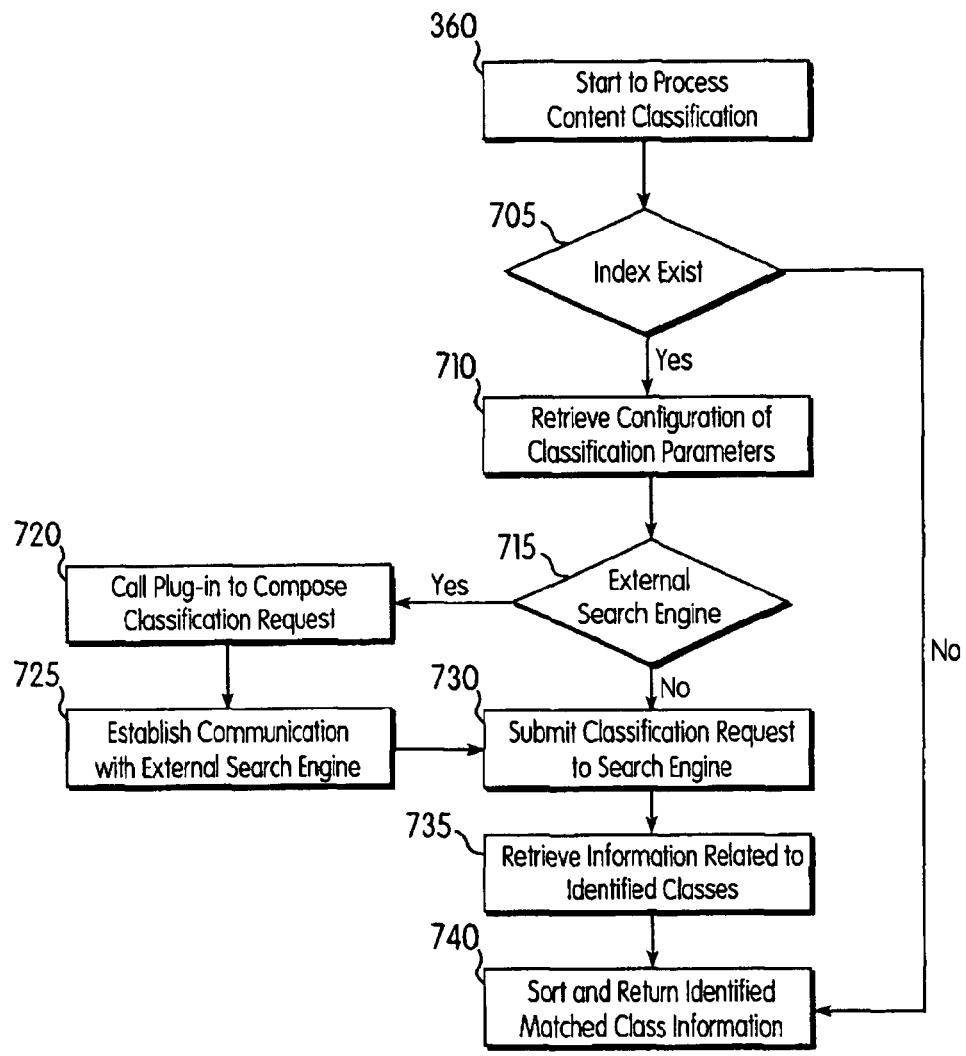

Further, if it is determined at block 355 that the request is one for content classification, then the processing proceeds to block 360 where a content classification process is started (an example of which is shown in FIG. 7). A classification can match the similarity between a text-based content, such as contained within an email message, and clusters created from the clustering process. The input text then can be classified into one or more of the pre-defined clusters. Finally, if it is determined at block 365 that the request is one requesting that an index search be executed, then the processing proceeds to block 370 where an index search process is started (an example of which is shown in FIG. 4).

In one example of the FIG. 3 process, the initial processing of index actions in the FIG. 1 system are performed by a dispatch unit to determine whether the request should be submitted to the design-time environment component 122, or by the run-time environment component 124. Thus in this example, blocks 310, 315, 325, 330, 335, 345, 355 and 365 are processed by the dispatch unit that will determine whether the request should be performed by the design-time environment component 122, or the run-time environment component 124. The processes represented by the blocks 340 and 350 are processed by the design-time environment component 122, and the processes represented by the blocks 360 and 370 are processed by the run-time environment component 124. The distinction between the design-time environment component 122 and the run-time environment component 124 can avoid the interference between indexing actions and search actions, according to one implementation.

Figure 4:
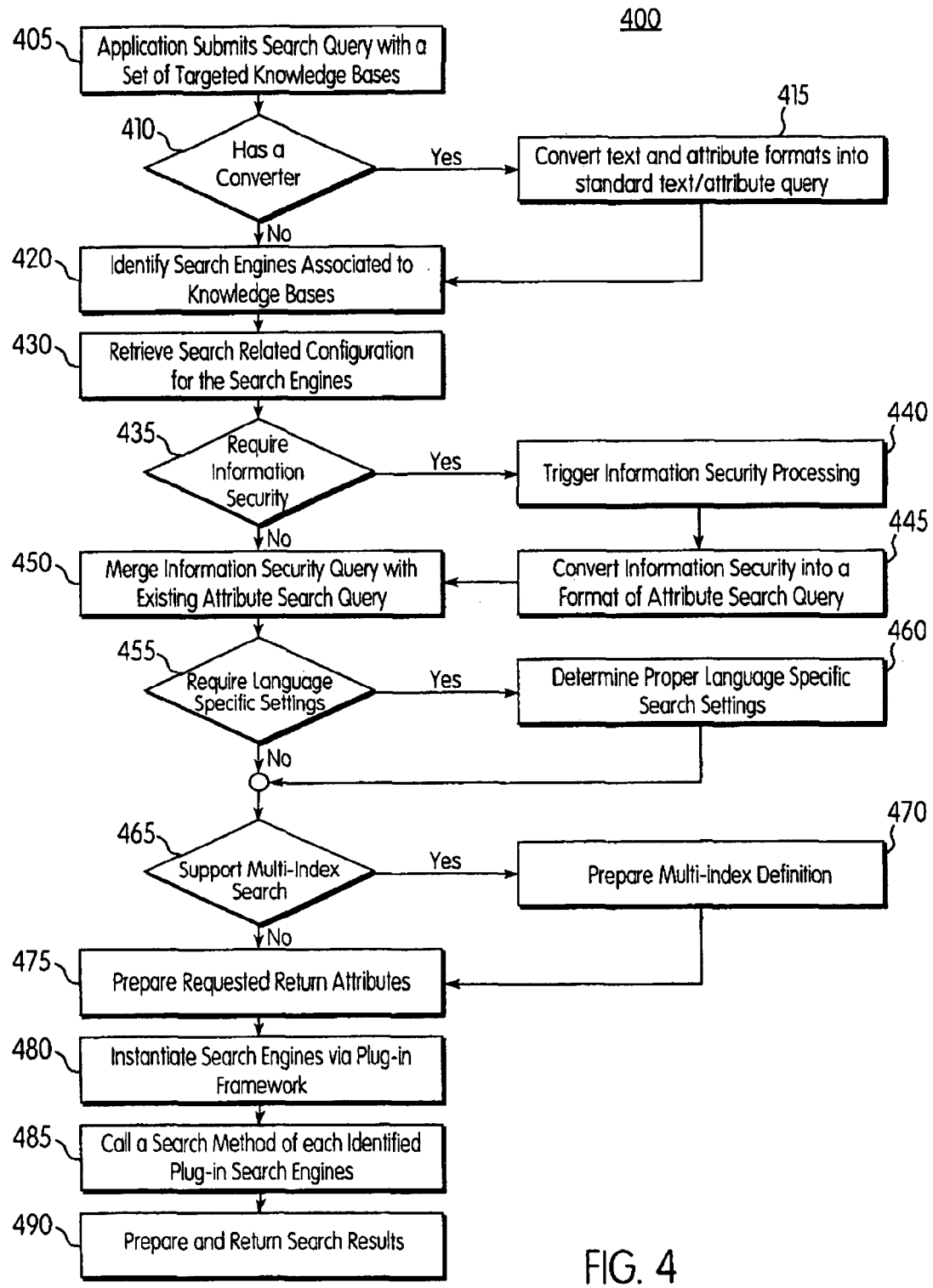

Referring now to FIG. 4, there is shown a flowchart that shows a process 400 that is performed when a request is received that is determined, for example at block 365 of the FIG. 3 process, to be an index search request. In one example of the FIG. 1 system, some of the blocks of the process 400 are performed by the search engine framework 116, while other blocks are performed by a specified one of the search engines 104a-104c. The process 400 begins at block 405 where an application (such as one of the applications 102a-102c) submits a search query that identifies a set of one or more targeted knowledge bases. In one example, the knowledge base or bases are identified because a user interacting with the application 102a-102c has explicitly selected the knowledge base to be searched, while in another example, the knowledge base or bases are identified by a process that determines the applicable knowledge base or bases to be searched for certain search criteria (e.g., terms or attributes) that a user has specified in the search request.

Next, at block 410, it is determined whether there is a converter for the particular software application from which the index search request was received. For example, if the software application from which the index search request was received has a search request format that differs from the standard format for the search engine framework 116, then the format used by the software application will need to be translated into the format used by the search engine framework 116. This block 410 may be performed by the application programming interface 120. If it is determined that there is a converter, then processing proceeds to block 415 where text and attribute formats for the received search request are converted into the standard, or generic, text and attribute format that is used by the search engine framework 116. This block 415 may include, for example, the translation of, or inclusion of, default values included in the search request, mapping attributes to corresponding names in the standard query format, managing attribute dependencies (such as city/zip code/country), or the stripping away of attributes that have no correspondence in the standard search query format.

After the conversion block 415, or if it is determined at block 410 that there is no converter, processing proceeds to block 420, where the search engine, or engines, that are associated, or mapped, to the targeted knowledge base or bases are determined. In one example of the FIG. 1 system, the run-time environment component 124 performs this block by making a call to the configuration database 130, where the applicable search engine is specified for the particular software application from which the index search request was received and for the specified knowledge base. In that a search request may involve more than one knowledge base, more than one search engine may be identified, where, for example, the knowledge bases are mapped to different search engines. Also, as discussed in connection with FIG. 2, the identification of the search engine, or engines, may take into account the language (for example, English, German, etc.) that has been specified for the index search.

Next, at block 430, search-related configuration information for the identified search engine, or engines, is retrieved. In one example of the FIG. 1 system, this search-related configuration information passed from the plug-in 118a-118c for the identified search engine 104a-104c. In another example of the FIG. 1 system, the configuration information may be stored in the configuration mapping 132 and it is the search engine services component 126 that retrieves the configuration information. The search-related configuration may include the location of a search engine, the return attribute values of search requests, the maximal number of returned "hits", the degree of fuzziness used for the search, or other parameters related to different fuzzy search algorithms. Following block 430, it is determined at block 435 whether information security is required for the search. Information security provides techniques that are implemented to prevent certain users from viewing or accessing certain knowledge base content. If it is determined that information security is required, processing proceeds to block 440 where information security processing is triggered. Next, at block 445, the information security is converted into a format of an attribute search query, and at block 450, that information security query is merged with the existing attribute search query. As such, the additional attributes converted from the information security serve to filter content from being identified in the index search.

Processing then proceeds to block 455, where it is determined if language-specific settings are required. If it is determined that they are, then processing proceeds to block 460, where the proper language-specific settings are determined. For example, the standard fuzzy search to allow spelling errors in alphabet-based languages cannot be used for other specific languages, such as Japanese, Chinese and Korean. In these cases, different language-specific settings may be needed to manage fuzzy searches. Next, at block 465, it is determined whether multiple index searching is needed, and whether that is supported. This may occur if multiple knowledge bases are specified by virtue of the originally received index search request, which means that multiple indexes would need to be searched. If it is so determined at block 465, then processing proceeds to block 470 where a multi-index definition is prepared. In one example, the multi-index definition defines the indexes to be searched and the attributes to be searched in each of the indexes. This may be done whether the indexes are being searched by the same search engine, or by different search engines.

After the multi-index definition has been prepared, or after it is determined that a multi-index search is not supported, processing proceeds to block 475, where requested return attributes are prepared. The functionality of requested return attributes can provide an efficient way to present the matched hits with additional details. In one example, different business applications, such as the applications 102*a-c* shown in FIG. 1, may need to present different details when searching a common index. In other example, different roles of users even using the same business application may require to view details, for example, in different fashions. For example, one user may have permission to view the details of all search results, while another user has only have permission to view the details of a sub-set of search results (possibly related only narrowly to this user's entry-level job function).

Next, at block 480, the applicable search engines are instantiated via a plug-in framework. As discussed previously, this may be implemented, for example, using object-oriented programming methods, wherein the plug-in functions to instantiate, from a generic index search query, or command, an index search object that is usable by the applicable search engine. As such, the index search object is instantiated within the applicable search engine. Then, at block 485, a call is made of a search method of each identified search engine. In the FIG. 1 system for example, this may be called by the search engine services component 126, and the method may be executed by the applicable search engine, and using the index search object that was instantiated in block 480. As such, a search of the applicable index, or indexes, is performed by the applicable search engine, or engines, to identify indexed content that meets the user-specified search criteria.

Finally, at block 490, the search results are prepared, and returned. The search results may comprise a list of content stored in the applicable knowledge base that meets the search criterion. In the FIG. 1 example, the results may be returned, firstly, to the search engine framework 116, and from there to the software application from which the index search request was received. As such, a "hit list" of content that meets the search criteria may be displayed for a user interacting with the software application. As such, the user may then review the list of content, and if desired, initiate a retrieval command to retrieve the content—in the form of an electronic document or the like—from the applicable knowledge base. Thereafter, the user may review the electronic document, for example, and in the example of a call center software application, may forward the retrieved electronic document to a customer by electronic mail.

Referring now to FIG. 5, there is shown a process 500 that is performed when an index update request is received, for example, as determined at blocks 310 and 315 of FIG. 3. In one implementation, the index update request identifies the knowledge bases for which associated indexes are to be updated. In another implementation, all knowledge base indexes will be periodically updated. After the process has been started at block 320, processing proceeds to block 505 where it is determined whether or not the update of a particular knowledge base is to be a delta type of update. If not, which means a full index update is to be performed, then processing proceeds to block 510 where the data source for the particular knowledge base is scanned for all of the knowledge entities from the original data source. In one implementation of the FIG. 1 system, block 510 may be initiated by the design-time environment component 122 of the search engine framework 116 and performed by the knowledge service component 114 of the knowledge repository 108. Because the meta-definitions of knowledge bases 110*a-d* are previously defined, the knowledge service component 114 may trigger a scanning action by either directly checking all knowledge entities from the original data sources, or communicating with the external data source (via one or more of the plug-ins 112*a-d*) to request information of all knowledge entities.

If it is determined at block 505 that a delta type of update process is to be performed, then processing proceeds to block 515 where it is determined whether or not data source scanning is required. Whether data source scanning is required may depend on whether a "push" or a "pull" methodology has been employed for modifications to knowledge entities. For example, a push methodology means that when a knowledge entity is modified in any way (that is, when it is created, revised or deleted), that the information of the knowledge entity is automatically "pushed" from the data source to the knowledge base, which in the FIG. 1 example means that it is pushed from an external data source (not shown in FIG. 1) into one of the knowledge bases 110*a*-110*d* via one of the data source plug-ins 112*a*-112*c*. When this occurs, the identities of modified knowledge entities may be stored in a buffer table, which for example may be maintained in the knowledge repository 108. Alternatively, a pull methodology may be employed, which means that a modification of a knowledge entity in the data source is not automatically pushed into the knowledge base, but instead must be pulled to the knowledge base, for example, as initiated by the knowledge repository 108 of the FIG. 1 system to check timestamps and determine which knowledge entity is created, modified, or marked for deletion.

Accordingly, where data source scanning is required, which means a pull methodology is employed, processing proceeds to block 520 where the applicable data source is scanned for modified knowledge entities. Then, at block 525, an update of the identities of the modified entities is provided into the previously described buffer table. As mentioned, in one implementation of the FIG. 1 system, the buffer table is provided in the knowledge repository 108. Next, at block 530, the buffer table is scanned to determine the identity of the knowledge entities that need to be updated into the search engine index.

Next, starting at block 535, batches of knowledge entities are retrieved from the applicable data source and indexed. In particular, at block 535, first a batch of knowledge entities is retrieved from the applicable data source. For example, in a database management system, the retrieval step may be a SQL (Structured Query Language) select statement for a database table with master key or ID information that will retrieve a set of knowledge entities with a fixed size. In many instances, a knowledge base (such as the knowledge bases 110a-d) may include many database tables, (e.g., a service order may have more than twenty database tables including linked documents). After the keys or ID's for a batch are obtained, entity details are retrieved by passing those ID's to trigger the knowledge base plug-ins 110a-d to get detailed information at block 540.

Then, at block 545, it is determined whether the index is being updated for an external search engine, or in other words, a search engine that has been integrated into the system via a plug-in (such as the plug-ins 118a-118c shown in the FIG. 1 example). In performing this action, it may first need to be determined from a configuration mapping database (such as database 130 in the FIG. 1 example) which of the search engines is mapped to be used in searches of the knowledge base for which an index is to be created. In addition, it may be that more than one search engine may be used to search for content in a particular knowledge base, for example, if one software application uses one search engine to search for content in the knowledge base, whereas another software application uses a different search engine to search for content in the same knowledge base. In such a case, more than one index will need to be created for the knowledge base to be updated, although not all search engine indexes for a particular knowledge base need be updated at the same time. If it is determined at block 545 that an external search engine is involved, then the processing proceeds to block 550 where the applicable plug-in (for example, one of the plug-ins 118a-118c) for the particular search engine for which an index is to be updated is called to compose an indexing request. In one implementation of the FIG. 1 system, this call is made by the search engine services component 126, and is executed by the applicable plug-in 118a-118c.

From block 550, processing proceeds to block 555 where search engine configuration information is retrieved, for example, from the applicable plug-in 118a-118c and by the search engine services component 126. Next, at block 560, communication is established (for example, by the search engine framework 116, and in particular, by the search engine services component 126) with the external search engine (for example, one of the search engines 104a-104c in the FIG. 1 system). Next, at block 565, the index action request is submitted to the applicable search engine for execution. Generally in response, the search engine then receives from the framework 116 the batch of entities and the entity details and creates an update to the index for the knowledge base for that search engine to use later in an index search.

After the update index action request has been submitted to the search engine, processing proceeds to block 570 where it is determined whether or not there remains any more batches of knowledge entities that require indexing. If so, then processing proceeds back to block 535 and processing of the next batch of knowledge entities proceeds as previously described. If it is determined at block 570 that there are no more batches to be indexed by the search engine, then processing proceeds to block 575 where indexing information may be logged, for example, as a record of the indexing action that has been performed. The log may include, for example, the date and time that the index update was performed, etc.

Referring now to FIG. 6, there is shown a process 600 that is performed when an process index clustering request is received, for example, as determined at block 350 in the FIG. 3 process. In one implementation, the request identifies the knowledge base to which the indexing request relates. From this information it can be determined which of the search engines (for example, of search engines 104a-104c) may be used by any software application to search for content in the knowledge base. Again, in the FIG. 1 system, for example, the applicable search engines may be determined from the mapping information 132 in the configuration database 130.

After the process 600 has been started at block 350, processing proceeds to block 605 where it is determined whether or not a search engine index exists for the specified knowledge base. If so, then processing proceeds to block 610 where configuration information of clustering parameters is retrieved. The clustering parameters are part of search engine configuration stored in the configuration database 130. The parameters, for example, include selection of clustering algorithms, selection of classification algorithms, maximal number of clusters, maximal level of hierarchical clusters, threshold to determine a characteristic features, and/or threshold to merge or divide clusters.

Then, at block 615, it is determined whether the index is being updated for an external search engine, as in the case of the FIG. 5 process (block 545). Again, in performing this action, it may first need to be determined from a mapping database (such as database 130 in the FIG. 1 example) which of the search engines is mapped to be used in searches of the knowledge base for which an index is to be created. In addition, it may be that more than one search engine may be used to search for content in a particular knowledge base, for example, if one software application uses one search engine to search for content in the knowledge base, whereas another software application uses a different search engine to search for content in the same knowledge case. In such a case, more than one index will need to be created for the knowledge base to be updated, although not all search engine indexes for a particular knowledge base need be updated at the same time. If it is determined at block 615 that an external search engine is involved, then the processing proceeds to block 620 where the applicable plug-in (for example, one of the plug-ins 118a-118c) for the particular search engine for which an index is to be updated is called to compose an indexing request. In one implementation of the FIG. 1 system, this call is made by the search engine services component 126, and is executed by the applicable plug-in 118a-118c.

From block 620, processing proceeds to block 625 where communication is established (for example, by the search engine framework 116, and in particular, by the search engine services component 126) with the external search engine (for example, one of the search engines 104a-104c in the FIG. 1 system). Next, at block 630, the clustering request is submitted to the applicable search engine for execution. Generally in response, the search engine then divides the indexed content into groups, or clusters, retrieves characteristic features from each cluster, and stores the characteristic cluster features, for example in the index created by the search engine 104a-c. A feature-cluster mapping may then be used to filter out non-essential features and to compare the differences between old relevant cluster feature sets and new relevant cluster feature sets.

Next, at block 635, it is determined whether the clustering action is finished, and if so, at block 640 information about the clustering action that has been performed and a time stamp as to when the clustering action occurred are logged for future reference if necessary. If it was determined at block 605 that a search engine index does not exist, then processing skips from block 605 to block 640, and that fact is logged.

Referring now to FIG. 7, there is shown a process 700 that is performed when an process content classification request is received, for example, as determined at block 350 in the FIG. 3 process. In one implementation, the request identifies the knowledge base to which the indexing action request relates. From this information it can be determined which of the search engines (for example, of search engines 104a-104c) may be used by any software application to search for content in the knowledge base. Again, in the FIG. 1 system, for example, the applicable search engines may be determined from the mapping information 132 in the configuration database 130.

After the process 700 has been started at block 360, processing proceeds to block 705 where it is determined whether or not a search engine index exists for the specified knowledge base. If so, then processing proceeds to block 710 where configuration information of classification parameters is retrieved. The parameters, for example, include the type of classification algorithms (e.g., k-mean, support vector machine), the threshold to determine whether a cluster matches the input text, or other algorithm specific parameters. The classification parameters are either stored in the configuration database 130 or passed with the classification request.

Then, at block 715, it is determined whether the index is being updated for an external search engine, as in the case of the FIG. 5 process (block 545) and of the FIG. 6 process (block 615). Again, in performing this action, it may first need to be determined from a mapping database (such as database 130 in the FIG. 1 example) which of the search engines is mapped to be used in searches of the knowledge base for which an index is to be created. In addition, it may be that more than one search engine may be used to search for content in a particular knowledge base, for example, if one software application uses one search engine to search for content in the knowledge base, whereas another software application uses a different search engine to search for content in the same knowledge case. In such a case, more than one index will need to be created for the knowledge base to be updated, although not all search engine indexes for a particular knowledge base need be updated at the same time. If it is determined at block 715 that an external search engine is involved, then the processing proceeds to block 720 where the applicable plug-in (for example, one of the plug-ins 118a-118c) for the particular search engine for which an index is to be updated is called to compose an index action request (and specifically, an index classification action request). In one implementation of the FIG. 1 system, this call is made by the search engine services component 126, and is executed by the applicable plug-in 118a-118c.

From block 720, processing proceeds to block 725 where communication is established (for example, by the search engine framework 116, and in particular, by the search engine services component 126) with the external search engine (for example, one of the search engines 104a-104c in the FIG. 1 system). Next, at block 730, the index classification request is submitted to the applicable search engine for execution. Generally in response, the applicable search engine performs an automated process on the knowledge base index that classifies the input texts to one or more of the generated clusters.

Next, at block 735, information related to the identified classes is retrieved. In the FIG. 1 implementation, for example, it may be the search engine services component 126 that retrieves this information, and the information may be retrieved from clusters by the applicable search engine. In another example, the detailed descriptions of matched clusters are returned along with the matched clusters by individual search engine. Then, this retrieved cluster information is organized based on the degree of matched similarity. If it was determined at block 705 that a search engine index does not exist, then processing skips from block 705 to block 740.

Referring now to FIG. 8, there is shown a process 800 that is performed when an process index maintenance request is received, for example, as determined at block 340 in the FIG. 3 process. In one implementation, the request identifies the knowledge base to which the indexing action request relates. From this information it can be determined which of the search engines (for example, of search engines 104a-104c) may be used by any software application to search for content in the knowledge base. Again, in the FIG. 1 system, for example, the applicable search engines may be determined from the mapping information 132 in the configuration database 130.

After the process 800 has been started at block 340, processing proceeds to block 805 where it is determined whether the index is being updated for an external search engine, as in the case of the FIG. 5 process (block 545), the FIG. 6 process (block 615), and of the FIG. 7 process (block 715). Again, in performing this action, it may first need to be determined from a mapping database (such as database 130 in the FIG. 1 example) which of the search engines is mapped to be used in searches of the knowledge base for which an index is to be created. In addition, it may be that more than one search engine may be used to search for content in a particular knowledge base, for example, if one software application uses one search engine to search for content in the knowledge base, whereas another software application uses a different search engine to search for content in the same knowledge case. In such a case, more than one index will need to be created for the knowledge base to be updated, although not all search engine indexes for a particular knowledge base need be updated at the same time. If it is determined at block 805 that an external search engine is involved, then the processing proceeds to block 810 where the applicable plug-in (for example, one of the plug-ins 118a-118c) for the particular search engine for which an index is to be updated is called to compose an index action request (and specifically, an index maintenance action request). In one implementation of the FIG. 1 system, this call is made by the search engine services component 126, and is executed by the applicable plug-in 118a-118c.

From block 810, processing proceeds to block 815 where communication is established (for example, by the search engine framework 116, and in particular, by the search engine services component 126) with the external search engine (for example, one of the search engines 104a-104c in the FIG. 1 system). Next, preparation is made to submit the index action request to the applicable search engine to be executed. If the index action request is to retrieve certain identified information about the index (for example, an index log information), as determined at block 820, and if it is determined at block 825 that the index exists, then processing proceeds to block 830 where the index information request is submitted to the applicable search engine for execution. Next, if the index action request is to delete the index, as determined at block 835, and if it is determined at block 825 that the index exists, then processing proceeds to block 830, where the index deletion request is submitted to the applicable search engine for execution. Finally, if the index action request is to create the index in the first instance, as determined at block 840, and if it is determined at block 845 that the index does not exist, then processing proceeds to block 830, where the index create request is submitted to the applicable search engine for execution. After the index action request has been submitted to the applicable search engine for execution, processing proceeds to block 850 where a log of the index action that was performed is created.

Figure 9:
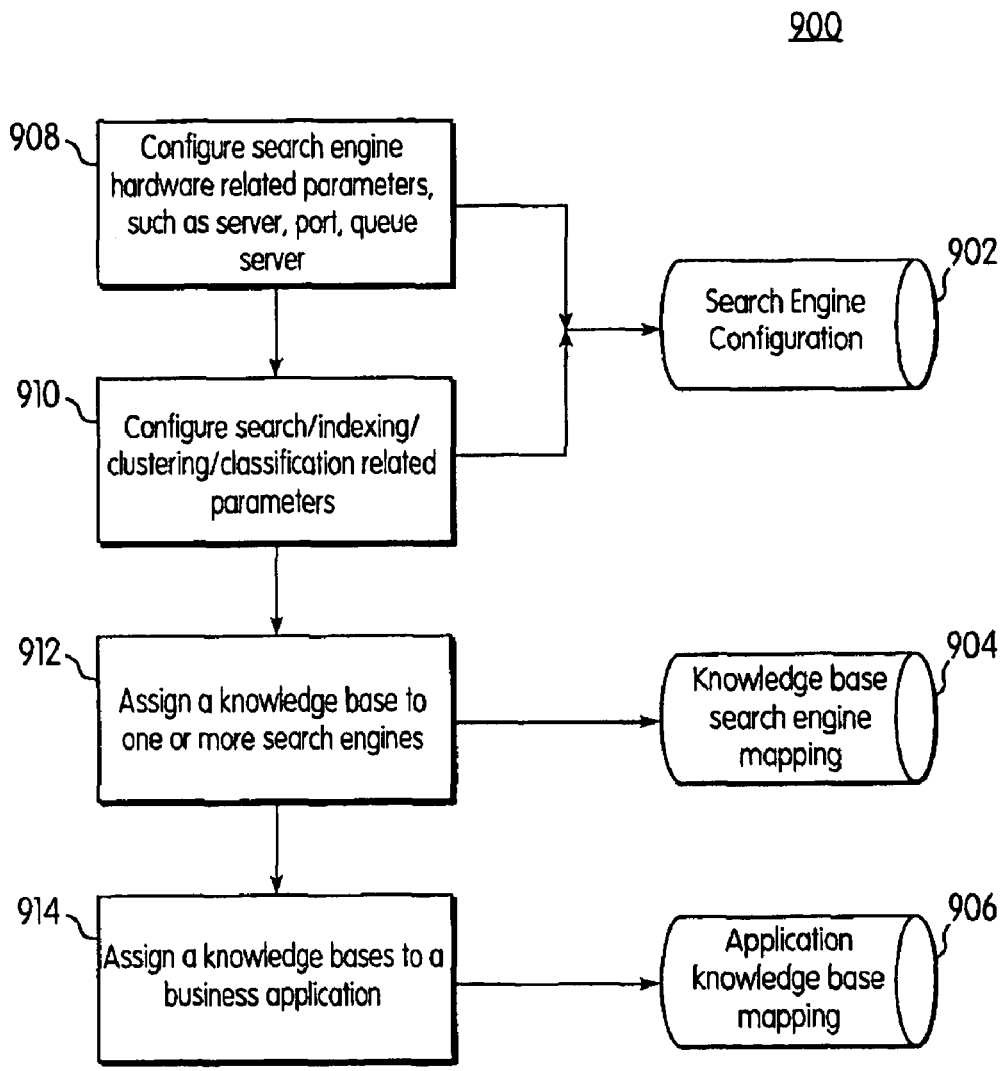
FIG. 9 is a flowchart of an example design-time process that may be executed to create mappings among applications, knowledge bases, and search engines.

FIG. 9 is a flowchart of an example design-time process 900 that may be executed to create mappings among the applications 102a-c, knowledge bases 110a-d, and search engines 104a-c. The process 900 may be performed within the enterprise computing system 100 shown in FIG. 1 to provide mappings to identify which of the several search engines 104a-c are to be used to execute searches of the indexes 106a-c of electronically stored knowledge base content. In one implementation, the process 900 may be performed by the search engine framework 116, which may also access the configuration database 130 and use one or more of the plug-ins 118a-c.

The process 900 begins at block 908, when the framework 116 configures search engine hardware-related parameters, such as server, port, and queue server parameters, for the various search engines 104a-c. The framework 116 may access the configuration database 130 to retrieve one or more predefined parameters from search engine configuration information 902 for the search engines 104a-c. In one implementation, the search engine services 126 may also include a portion of the search engine configuration information 902. The configuration parameters may include various predefined parameters used when interfacing with search engines in general. For examples, the various search engines 104a-c typically reside on one or more servers and have input/output ports for communication with the framework 116. Therefore, the configuration parameters would typically include parameters for server and port information. In addition, the plug-ins 118a-c may provide engine-specific values for various parameters that are specific to the corresponding engines 104a-c.

At block 910, the framework 116 further configures search indexing, clustering, and classification related parameters. As described earlier, the framework 116 retrieves certain indexing, clustering, and classification configuration information from the database 130 and uses this information to configure the engines 104a-c and the indexes 106a-c. To do so, the framework 116 makes use of the engine-specific plug-ins 118a-c. In one implementation, the framework 116 is also capable of updating the search engine configuration information 902 that may be contained within the framework 116 and/or within the database 130. If the framework 116 has been specifically configured within, for example, the design-time environment 122, of if the framework 116 obtains any configuration information via the administration UI 128, the framework 116 may then update the search engine configuration information 902.

At block 912 of the process 900, the framework 116 assigns, or maps, each knowledge base 110a-d to one or more of the search engines 104a-c based upon identification (by input from the administration UI 128 or by the framework 116 itself) of information contained within the knowledge bases 110a-d and identification of the specific search engines 104a-c. In one implementation, the framework 116 uses its design-time environment 122 to determine the assignments. For example, the design-time environment 122 may include a rule-based engine that automatically assigns knowledge bases 110a-d to search engines 104a-c based upon the rules that are used and the type of content contained within (or provided by) the knowledge bases 110a-d. In one implementation, the framework 116 may receive input from the administration UI 128 that specifies the mappings between knowledge bases 110a-d and search engines 104a-c. An individual search engine that is assigned to a given knowledge base will access and use an index, such as one of the indexes 106a-c, that contains index entries for electrical content contained within the given knowledge base. A knowledge base can be assigned to more than one search engine. For example, the knowledge base 110a may be assigned to the engines 104a and 104b. In this example, the indexes 106a and 106b will each include index entries for content contained within the knowledge base 110a.

Once the framework 116 has assigned knowledge bases to search engines, the framework updates the knowledge base-to-search engine mapping information 904 that is stored within the database 130. In one implementation, the mapping information 904 is included within the mappings 132 shown in FIG. 1.

At block 914, the framework 116 assigns knowledge bases 110a-d to business applications 102a-c and stores assignment information within the application-to-knowledge base mapping information 906 within the database 130. In one implementation, the mapping information 906 is included within the mappings 132 shown in FIG. 1. The assignments are based upon identification (by input from the applications 102a-c, from the administration UI 128, or by the framework 116 itself) of one of the knowledge bases 110a-d. For example, one of the applications 102a-c may send a search request to the framework 116. The search request may include an identification of one of the knowledge bases 110a-d. Upon receipt of the request, the framework 116 can store the mapping information for the application and identified knowledge base within the mapping information 906 for later use. In another example, the search request may not explicitly include an identification of one of the knowledge bases 110a-d. In this case, the framework 116 may dynamically determine a mapping between the application and one of the knowledge bases 110a-d using a rule-based engine that analyzes the type of application that has provided the request and attempts to find a match with a specific knowledge base. Alternatively, the framework 116 may access the mapping information 906 to determine if mapping information exists for the given application. For example, if the same application 102a-c had previously sent a request identifying one of the knowledge bases 110a-d, and if the framework 116 captured this identification within the mapping information 906, the framework 116 may then identify the same knowledge base upon receipt of subsequent requests from the same application.

In one implementation, the design-time environment 122 may also play a role in assigning knowledge bases to business applications by receiving input from the administration UI 128. In this implementation, an administrator may use the administration UI 128 to send configuration commands to the framework 116 to specify assignments between knowledge bases 110a-d and applications 102a-c. The design-time environment 122 may process these configuration commands and provide the assignment information for storage within the mapping information 132.

When the framework 116 has received a search request from an application 102a-c and has identified a knowledge base 110a-d, the framework 116 can then access the mapping information 904 to determine which search engine 104a-c (and corresponding index 106a-c) that is to be used in processing the search request, as is described above in reference to earlier figures. The framework 116 also accesses the configuration information 902 that is used for interfacing with the assigned search engine 104a-c by way of the plug-ins 118a-c.

Figure 10:
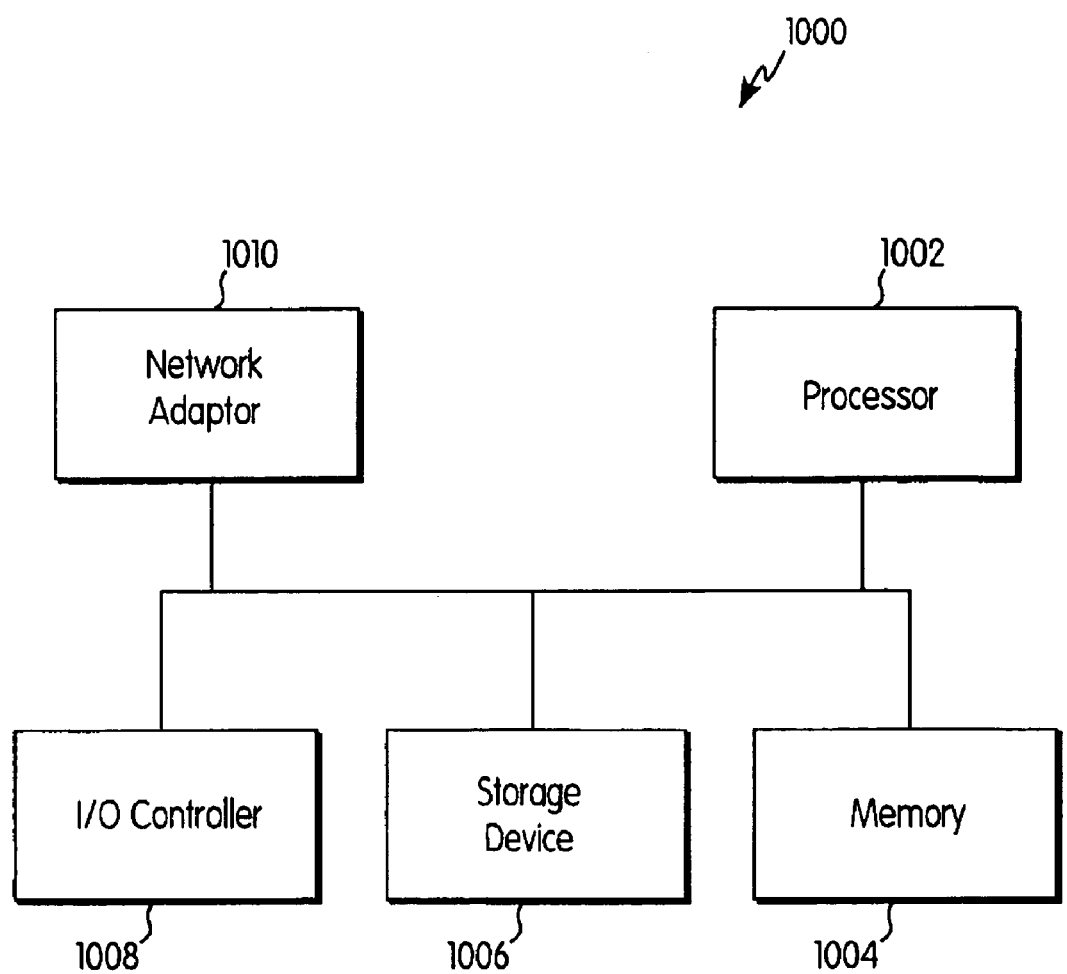
FIG. 10 is a block diagram of a computing device that may be used to provide the environment for the search engine framework shown in FIG. 1, according to one implementation.

FIG. 10 is a block diagram of a computing device 1000 that may be used to provide the environment for the search engine framework 116 shown in FIG. 1, according to one implementation. The computing device 1000 includes a processor 1002, a memory 1004, a storage device 1006, an input/output controller 1008, and a network adaptor 1010. Each of the components 1002, 1004, 1006, 1008, and 1010 are interconnected using a system bus. The processor 1002 is capable of processing instructions for execution within the computing device 1000. In one implementation, the processor 1002 is a single-threaded processor. In another implementation, the processor 1002 is a multi-threaded processor. The processor 1002 is capable of processing instructions stored in the memory 1004 or on the storage device 1006 to display graphical information for a graphical user interface (GUI) on an external input/output device that is coupled to the input/output controller 1008.

The memory 1004 stores information within the computing device 1000. In one implementation, the memory 1004 is a computer-readable medium. In one implementation, the memory 1004 is a volatile memory unit. In another implementation, the memory 1004 is a non-volatile memory unit.

The storage device 1006 is capable of providing mass storage for the computing device 1000. In one implementation, the storage device 1006 is a computer-readable medium. In various different implementations, the storage device 1006 may be a floppy disk device, a hard disk device, an optical disk device, or a tape device.

In one implementation, a computer program product is tangibly embodied in an information carrier. The computer program product contains instructions that, when executed, perform one or more methods, such as those described above. The information carrier is a computer- or machine-readable medium, such as the memory 1004, the storage device 1006, or a propagated signal.

The input/output controller 1008 manages input/output operations for the computing device 1000. In one implementation, the input/output controller 1008 is coupled to an external input/output device, such as a keyboard, a pointing device, or a display unit that is capable of displaying various GUI's.

The computing device 1000 further includes the network adaptor 1010. The computing device 1000 uses the network adaptor 1010 to communicate with other network devices that may be included within the system 100.

A number of implementations of the invention have been described. Nevertheless, it will be understood that various modifications may be made without departing from the spirit and scope of the invention. Accordingly, other implementations are within the scope of the following claims.

What is claimed is:

1. A method included in performing an indexing action for content that is electronically stored in a knowledge base, the method comprising:

receiving—at a search engine framework component that enables electronic knowledge base search services to use multiple different knowledge bases and multiple different search engines for multiple different software applications—input indicating a request that an indexing action computer-implemented process to create or update an index be perform related to a specific one of the multiple different knowledge bases and a specific one of the multiple different search engines, the specific one search engine to search an index of the specific one knowledge base, wherein the specific one knowledge base is mapped in a preconfigured manner to the specific one search engine for at least one of the multiple different software applications;

performing a conversion computer-implemented process that composes, using the received indexing action request, a converted indexing action request to perform the indexing action computer-implemented process, wherein the converted indexing action request has a format that is compatible with the specific one search engine; and submitting the converted indexing action request to the specific one search engine for execution of the indexing action related to the specific one knowledge base and the corresponding searchable index of the specific one knowledge base.

2. The method of claim 1, wherein receiving input indicating the request that the indexing action computer-implemented process be performed includes receiving input from a software application.

3. The method of claim 2, wherein receiving input from the software application includes receiving input from an administrative software application that is capable of providing configuration information.

4. The method of claim 1, wherein receiving input indicating the request that the indexing action computer-implemented process be performed includes receiving configuration input from a software application specifying a specific configuration for the corresponding searchable index of the specific one knowledge base.

5. The method of claim 1, wherein receiving input indicating the request that the indexing action computer-implemented process be performed includes receiving input from a software application that indicates a search request to search for specific content contained in the corresponding searchable index of the specific one knowledge base.

6. The method of claim 5, wherein the search request includes an identification of the specific one knowledge base.

7. The method of claim 6, further comprising determining the specific one search engine upon receipt of the input received from the software application.

8. The method of claim 7, wherein determining the specific one search engine upon receipt of the input received from the software application includes using predefined configuration information that specifies an assignment between the specific one knowledge base and the specific one search engine.

9. The method of claim 1, further comprising receiving execution results from the specific one search engine subsequent to submission of the composed converted indexing action request.

10. The method of claim 9, wherein the execution results comprise search results for content contained within the corresponding searchable index of the specific one knowlege base.

11. The method of claim 9, further comprising providing the execution results to a software application.

12. The method of claim 1, wherein performing the conversion computer-implemented process that composes, using the received request, the converted indexing action request to perform the indexing action computer-implemented process includes transforming the received indexing action request in order to create the converted indexing action request that has the format that is compatible with the specific one search engine.

13. The method of claim 1, wherein receiving input indicating the request that the indexing action computer-implemented process be performed that acts upon the corresponding searchable index of content that is searchable using the specific one of multiple search engines includes receiving input indicating a specific request to create new entries within the corresponding searchable index corresponding to information contained within the specific one knowledge base.

14. The method of claim 13, wherein receiving input indicating the specific request to create new entries within the corresponding index includes receiving input from a software application.

15. The method of claim 13, further comprising receiving information from the specific one electronic knowledge base, and wherein the composed converted indexing action request includes a creation request to create new entries within the corresponding index by using the received information from the specific one knowledge base.

16. The method of claim 13, wherein performing the conversion computer-implemented process that composes the request to perform the indexing action computer-implemented process includes executing instructions specific to the specific one search engine that cause the converted indexing action request to be composed with the format that is compatible with the specific one search engine.

17. The method of claim 1, wherein receiving input indicating the request that the indexing action computer-implemented process be performed that acts upon the corresponding searchable index of content that is searchable using the specific one of multiple search engines includes receiving input indicating a specific request to update existing entries within the corresponding index corresponding to information that has been updated within the specific one knowledge base.

18. The method of claim 17, further comprising receiving updated information from the specific one knowledge base, and wherein the composed converted indexing action request includes an update request to update existing entries within the corresponding index by using the updated information received from the specific one knowledge base.

19. The method of claim 18, further comprising requesting the updated information from the specific one knowledge base.

20. The method of claim 18, wherein submitting the composed converted indexing action request to the specific one search engine for execution includes submitting the composed converted indexing action request to cause the specific one search engine to update only those entries within the corresponding index that are affected by the updated information received from the specific one knowledge base.

21. The method of claim 1, wherein receiving input indicating the request that the indexing action computer-implemented process be performed that acts upon the corresponding index of content that is searchable using the specific one of multiple search engines includes receiving input indicating a specific request to delete existing entries within the corresponding index.

22. The method of claim 21, wherein receiving input indicating the specific request to delete existing entries within the corresponding index includes receiving input indicating the specific request to delete existing entries within the specified index corresponding to information that has been deleted within the specific one knowledge base.

23. The method of claim 1, wherein receiving input indicating the request that the indexing action computer-implemented process be performed that acts upon the corresponding index of content that is searchable using the specific one of multiple search engines includes receiving input indicating a specific request to create an index cluster within the corresponding index, the index cluster being associated with a related set of index entries.

24. The method of claim 23, wherein receiving input indicating the specific request to create the index cluster within the corresponding index includes receiving input from a software application.

25. The method of claim 23, further comprising classifying content contained within the specific one knowledge base with the index cluster for the corresponding index.

26. The method of claim 25, wherein submitting the composed converted indexing action request to the specific one search engine for execution includes submitting the composed converted indexing action request for creation of an index entry within the index cluster that corresponds to the classified content.

27. The method of claim 1, wherein the input indicating a request that an indexing action computer-implemented process to create or update an index be performed is generated by the search engine framework component.

28. A computer program product tangibly embodied in machine readable storage medium, the computer program product including instructions that, when executed, perform a method included in a performing an index action for content that is electronically stored in a knowledge base, the method comprising:

receiving—at a search engine framework component that enables electronic knowledge base search services to use multiple different knowledge bases and multiple different search engines for multiple different software applications—input indicating a request that an indexing action computer-implemented process to create or update an index be performed related to a specific one of the multiple different knowledge bases and a specific one of the multiple different search engines, the specific search engine to search an index of the specific one knowledge base, wherein the specific one knowledge base is mapped in a preconfigured manner to the specific one search engine for at least one of the multiple different software applications;

performing a conversion computer-implemented process that composes, using the received indexing action request, a converted indexing action request to perform the indexing action computer-implemented process, wherein the converted indexing action request has a format that is compatible with the specific one search engine; and submitting the converted indexing action request to the specific one search engine for execution of the indexing action related to the specific one knowledge base and the corresponding searchable index of the specific one knowledge base.

29. The computer program product of claim 28, wherein the input indicating a request that an indexing action computer-implemented process to create or update an index be performed is generated by the search engine framework component.

30. A computer system for performing an indexing action for content that is electronically stored in a knowledge base, the computer system comprising:

a processor a memory having instructions executable by the processor to perform the following steps:

receive—at a search engine framework component that enables electronic knowledge base search services to use multiple different knowledge bases and multiple different search engines for multiple different software applications—input indicating a request that an indexing action computer-implemented process to create or update an index be performed related to a specific one of the multiple different knowledge bases and a specific one of the multiple different search engines, the specific search engine to search an index of the specific one knowledge base, wherein the specific one knowledge base is mapped in a preconfigured manner to the specific one search engine for at least one of the multiple different software applications;

perform a conversion computer-implemented process that composes, using the received indexing action request, a converted indexing action request to perform the indexing action computer-implemented process, wherein the converted indexing action request has a format that is compatible with the specific one search engine; and submit the converted indexing action request to the specific one search engine for execution of the indexing action related to the specific one knowledge base and the corresponding searchable index of the specific one knowledge base.

31. The system of claim 30, wherein the input indicating a request that an indexing action computer-implemented process to create or update an index be performed is generated by the search engine framework component.

* * * * *